US007716482B2

(12) United States Patent
Jung et al.

(10) Patent No.: US 7,716,482 B2
(45) Date of Patent: May 11, 2010

(54) CONFERENCE SESSION KEY DISTRIBUTION METHOD IN AN ID-BASED CRYPTOGRAPHIC SYSTEM

(75) Inventors: Bae-eun Jung, Seongnam-si (KR); Dae-youb Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1409 days.

(21) Appl. No.: 10/968,012

(22) Filed: Oct. 20, 2004

(65) Prior Publication Data

US 2005/0084114 A1 Apr. 21, 2005

(30) Foreign Application Priority Data

Oct. 20, 2003 (KR) .................. 10-2003-0072982

(51) Int. Cl.
*H04L 9/32* (2006.01)
*H04L 9/00* (2006.01)
*H04L 9/08* (2006.01)

(52) U.S. Cl. .................. 713/171; 380/277; 380/278
(58) Field of Classification Search .................. 380/277, 380/278; 713/171
See application file for complete search history.

(56) References Cited

U.S. PATENT DOCUMENTS

| 5,896,455 | A | | 4/1999 | Vanstone et al. | |
| 6,151,395 | A | * | 11/2000 | Harkins | 380/286 |
| 6,336,188 | B2 | * | 1/2002 | Blake-Wilson et al. | 713/171 |
| 6,769,060 | B1 | * | 7/2004 | Dent et al. | 713/168 |
| 7,047,408 | B1 | * | 5/2006 | Boyko et al. | 713/169 |
| 7,127,063 | B2 | * | 10/2006 | Lambert et al. | 380/44 |
| 7,243,232 | B2 | * | 7/2007 | Vanstone et al. | 713/171 |
| 7,334,127 | B2 | * | 2/2008 | Struik | 713/168 |
| 2004/0131191 | A1 | * | 7/2004 | Chen et al. | 380/282 |

FOREIGN PATENT DOCUMENTS

EP 0 739 105 A1 10/1996

OTHER PUBLICATIONS

IEEE Communications Letters, vol. 8, No. 7, Jul. 2004 Attacks to Xu-Tilborg's Conference Key Distribution Scheme Bae Eun Jung, Seong-Hun Paeng, and DaeYoub Kim.*
Identity-Based Encryption from the Weil Pairing Dan Boneh and Matthew Franklin Appears in SIAM J. of Computing, vol. 32, No. 3, pp. 586-615, 2003.*
Xu, et al, * Entitled, IEEE, pp. 269, ISIT 2000, Sorento, Italy,XP010510145, (Jun. 25-30, 2000).

(Continued)

*Primary Examiner*—Kambiz Zand
*Assistant Examiner*—Benjamin A Kaplan
(74) *Attorney, Agent, or Firm*—NSIP Law (57) ABSTRACT

A conference session key distribution method used in an ID-based cryptographic system includes selecting two different temporary secret keys, generating a message and generating session key generation variables using the temporary secret keys of a session initiating party. Only valid participating parties receive the session key generation variables. Each party determines the session shared key from the session key generation variables.

23 Claims, 2 Drawing Sheets

OTHER PUBLICATIONS

Harn, et al., ** Entitled, IEEE J. on Selected Areas in Communications, 11(5):757 (Jun. 1, 1993).

Smart, Entitled, ***Electronics Letters, IEE Stevenage, GB 38(13)630 (Jun. 20, 2002).

Joshua B. Nelson, "*The Diffie-Hellman Key Exchange in matrices over a Field and a Ring*," Submitted to the Graduate Faculty of Texas Tech University, noted in the document as "Accepted" on May of 2003, pp. i-24 (total of 29 pages).

* cited by examiner

FIG. 1

FIG. 2

CONFERENCE SESSION KEY DISTRIBUTION METHOD IN AN ID-BASED CRYPTOGRAPHIC SYSTEM

BACKGROUND OF THE INVENTION

1. Field of the Invention

The present invention relates to a data transmission method. More particularly, the present invention relates to a method of distributing a conference session key which is shared in order to encrypt data between a plurality of parties.

2. Description of the Related Art

As computers become ubiquitous, networks connecting the computers become more important and useful. However, recently, attacks on computers and networks have increased. Thus, network security techniques are needed.

An inter-party key sharing protocol is a protocol used for keeping data transmitted through networks secret. A standard protocol is a Diffie-Hellman type protocol, which is based on difficulty in solving an elliptic curve cryptographic discrete logarithm problem. The Diffie-Hellman type protocol is based on a public key infrastructure (PKI) encryption. However, PKI encryption has shortcomings, e.g., requiring participation of a reliable authentication center, since integrity of a public key must be guaranteed by the authentication center.

Because of the shortcomings of PKI encryption, much research has been conducted on an ID-based key sharing protocol which is not based on PKI encryption. Unfortunately, conventional ID-based key sharing protocols have problems, e.g., they are vulnerable to a disguised attack and cannot provide forward secrecy.

SUMMARY OF THE INVENTION

The present invention is therefore directed to a data transmission method and a computer-readable storage medium containing a program by which the data transmission method is executed, which substantially overcome one or more of the problems due to the limitations and disadvantages of the related art.

It is a feature of an embodiment of the present invention to provide a conference session key distribution method capable of preventing a disguised attack.

It is another feature of an embodiment of the present invention to provide a conference session key distribution method capable of providing forward secrecy.

At least one of the above and other features and advantages of the present invention may be realized by providing a method of distributing a session shared key for encryption from a session initiating party to a plurality of session participating parties in a single conference session on an ID-based cryptographic system, including (a) generating two temporary secret keys for the session initiating party, two temporary public keys for the session initiating party, and a signature value obtained by applying a predetermined signature function to the keys, (b) sending a message including ID information of the session initiating party, the temporary public keys for the session initiating party, and the signature value to the session participating parties, (c) receiving messages including the temporary public keys for the session participating parties from the session participating parties, and determining validity of the messages, (d) generating shared key generation variables for the session participating parties that have sent valid messages, (e) generating the session shared key and encrypting the ID information of the session initiating party using the session shared key; and (f) sending a message including the shared key generation variables and the encrypted ID information to the session participating parties that have sent valid messages.

At least one of the above and other features and advantages of the present invention may be realized by providing a method of distributing a session shared key for encryption from a session initiating party to session participating parties in a single conference session on an ID-based cryptographic system, including (a) receiving a message including ID information, a temporary public key, and a predetermined signature value of the session initiating party from the session participating party, and determining validity of the message, (b) generating two temporary secret keys for the session participating parties, two temporary public keys for the session participating parties, and a signature value obtained by applying a predetermined signature function to the keys; (c) sending a message including the temporary public keys for the session participating parties and the signature value to the session initiating party, (d) receiving a message including a shared key generation variable and encrypted ID information of the session initiating party from the session initiating party, (e) generating a session shared key using the shared key generation variable and the temporary secret keys for the session participating parties, and (f) decrypting the encrypted ID information of the session initiating party using the session shared key, and determining whether the session shared key is valid.

At least one of the above and other features and advantages of the advantages may be realized by providing a computer-readable medium having recorded thereon a computer-readable program for performing the methods.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 2003-72982, filed on Oct. 20, 2003, in the Korean Intellectual Property Office, and entitled: "Conference Session Key Distribution Method in an ID-Based Cryptographic System," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Now, a conference session shared key distribution method according to the present invention will be described in detail with reference to the accompanying drawings.

Figure 1:
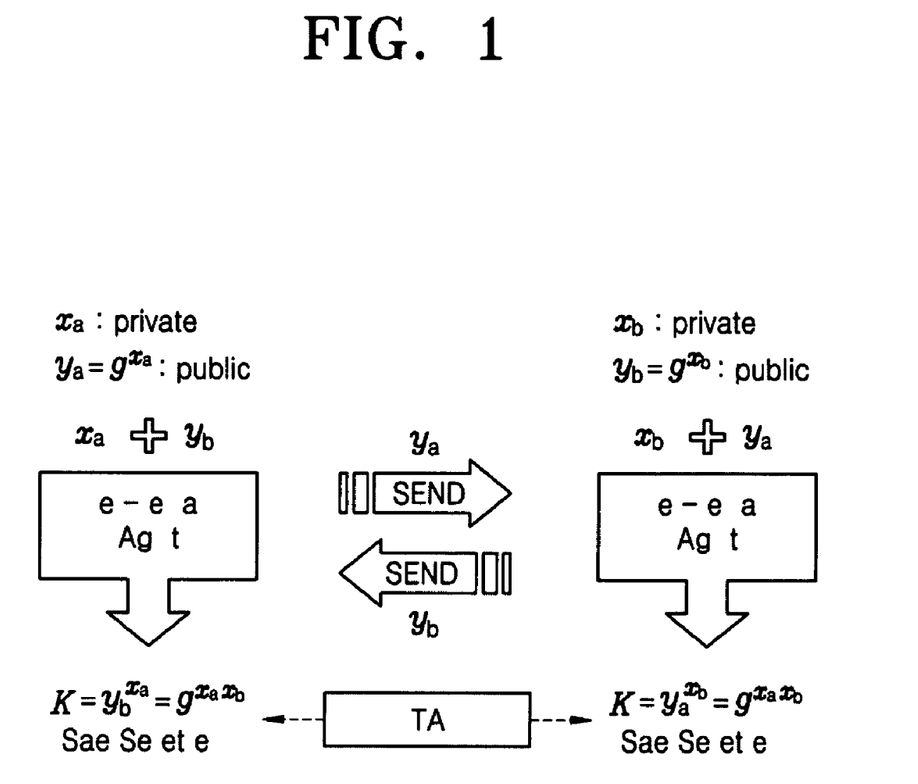
FIG. 1 is a conceptual diagram illustrating a cryptographic system using a discrete logarithm problem in a finite field.

FIG. 1 is a conceptual diagram illustrating a cryptographic system using a discrete logarithm problem in a finite field.

The cryptographic system according to the present invention is based on difficulty in solving a discrete logarithm problem in an elliptic curve cryptographic group. The discrete logarithm in the elliptic curve\cryptographic group is a logarithm using an elliptic curve additive group defined in a finite field, i.e., its domain of definition. It is known that a problem involved in the discrete logarithm function in the finite field rather than the real number field is very difficult to solve, because estimation using a simple magnitude comparison is not available. In the present invention, the encryption of data is performed relying on the difficulty in solving the discrete logarithm problem.

In the cryptographic system using the finite field discrete logarithm problem, parties which participate in data encryption share two variables p and g. The variable p is a sufficiently large prime number determined depending on a level of secrecy of the cryptographic system. The variable g is a generation source of the finite field multiplicative group which has a divisor q of p−1 as an order. As shown in FIG. 1, two parties A and B select their own secret keys $x_a$ and $x_b$, i.e., integers between 1 and q−1. The parties calculate their own public keys $y_a$ and $y_b$ using their own secret keys, as represented by the following Equations (1) and (2).

$$y_a = g^{x_a} \bmod p \quad (1)$$

$$y_b = g^{x_b} \bmod p \quad (2)$$

The two parties A and B exchange public keys, and share a shared key K obtained from the other party's public keys and their own secret keys using the following Equation (3).

$$K = g^{x_a x_b} \bmod p \quad (3)$$

The party A calculates the shared key K using its own secret key $x_a$ and the public key $x_b$ of the party B, as represented by the following Equation (4).

$$K = y_a^{x_b} = (g^{x_b})^{x_a} = g^{x_a x_b} \bmod p \quad (4)$$

The party B calculates the shared key K using its own secret key $x_b$ and the public key $x_a$ of the party A, as represented by the following Equation (5).

$$K = y_a^{x_b} = (g^{x_a})^{x_b} = g^{x_a x_b} \bmod p \quad (5)$$

Although any attacker knows the public key, he must solve the discrete logarithm problem in the cryptographic system. Therefore, the user's secret key is not revealed.

In the Diffie-Hellmann method, which basically utilizes the system illustrated in FIG. 1, both users have to temporarily generate their own secret keys and public keys for each and every communication event in a practical application. Therefore, an authentication center, or trusted authority TA, must authenticate the users for every communication event.

Harn and Yang have proposed a cryptographic system to solve this inconvenience by sharing a temporary key at every communication session using identification (ID) information. The system is called an ID-based cryptographic system.

In addition, Xu and Tilborg have proposed a multi-party key sharing protocol using Harn and Yang's method. The multi-party key sharing protocol is a protocol which implements key sharing among more than three parties, and includes a key distribution protocol and a key agreement protocol. The key distribution protocol is a protocol in which a session initiating party generates a key and securely distributes the key to the other parties as a shared key. The key agreement protocol is a protocol where a common key to all the participating parties is commonly processed to be used as a session shared key.

The Xu and Tilburg method is a key distribution protocol including an ID-based cryptographic system implementation step and a key sharing protocol step. The ID-based cryptographic system utilizes the Ham and Yang method.

The parties participating in each conference session are classified into a session initiating party A and session participating parties B and C.

In the ID-based cryptographic system implementation step, a key authentication center (KAC) provides its own public key y. The parties i (i=A, B, C) participating in the session know public key parameters G, p, α, y and f. The parameter G is a multiplicative group GF(P)* of a finite field including modulo p integers. The parameter p is a sufficiently large prime number. The "modulo p" is an operator that returns a remainder after dividing by p. The group G has the parameter α as its generation source. The parameter f is a hash function. Each party i has a secret key $s_i$ and a public key $r_i$ provided by KAC.

The steps of Xu and Tilborg's key sharing protocol are as follows.

Step 1). The party A selects an integer $v_1$, which is coprime to p−1, between integers 1 and p−1.

Step 2). The party A generates temporary public keys $w_1$ and $\eta_1$ represented by the following Equations (6) and (7) respectively.

$$w_1 = y^{v_1} (\bmod p) \quad (6)$$

$$\eta_1 = (f(ID_1, time) - v_1 w_1) s_1^{-1} (\bmod p-1) \quad (7)$$

In Equation (7), $ID_1$ is ID information of the party A and time is time information of the time of generating Equation (7).

Step 3). The party A generates a message ($ID_1$, $r_1$, $w_1$, $\eta_1$, time) and sends the message to the session participating parties B and C.

Step 4). The session participating parties B and C receive the message ($ID_1$, $r_1$, $w_1$, $\eta_1$, time) and determine whether the message satisfies the following Equation (8).

$$y^{f(ID_1, time)} = w_1^{w_1} (\alpha^{EID_1} r_1^{-r_1})^{\eta_1} (\bmod p) \quad (8)$$

where $EID_1 = f(ID_1)$.

If the message is sent by a valid session initiating party, it satisfies Equation (8). If the message is sent by an invalid session initiating party, it does not satisfy Equation (8). Therefore, the validity of the message sent by the party A can be completely determined using Equation (8). If Equation (8) is satisfied, the protocol proceeds to the next step. Otherwise, the protocol is terminated.

Step 5). The session participating parties B and C select integers $v_B$ and $v_C$, which are co-prime to p−1, between integers 1 and p−1, respectively.

Step 6). The session participating parties B and C generate their own parameters $w_j$, $n_j$, and $\eta_j$ using the selected integer $v_j$ (j=B, C), as represented by the following Equations (9) through (11).

$$w_j = y^{v_j} (\bmod p) \quad (9)$$

$$n_j = w_1^{v_j} (\bmod p) \quad (10)$$

$$\eta_j = (n_j - v_j w_j) s_j^{-1} (\bmod p-1) \quad (11)$$

Step 7). The session participating parties B and C each generate their own message ($ID_j$, $r_j$, $w_j$, $n_j$, $\eta_j$) and send the message to the session initiating party A.

Step 8). The session initiating party A determines that each message satisfies the following Equation (12) using the variables received from the session participating parties B and C, respectively.

$$y^{n_j} = w_j^{w_j} (\alpha^{EID_j} r_j^{-r_j})^{\eta_j} (\bmod p) \quad (12)$$

where $EID_j = f(ID_j)$.

If the message is sent by a valid session participating party, it satisfies Equation (12). If the message is sent by an invalid session participating party, it does not satisfy Equation (12). Therefore, the validity of the message sent by the session participating parties B and C can be completely determined using Equation (12). If Equation (12) is satisfied, the protocol proceeds to the next step. Otherwise, the protocol is terminated.

Step 9). The session initiating party A selects an integer r between 1 and p−1 and generates a shared key $K_C$ and a variable $z_j$ represented by the following Equations (13) and (14), respectively.

$$K_C = y^r (\bmod p) \qquad (13)$$

$$z_j = n_j^{v_1^{-1} r} (\bmod p) \qquad (14)$$

Step 10). The session initiating party A generates $E_{Kc}(ID_1)$ by encrypting its own ID information $ID_1$ with the shared key $K_C$. Here, E is an encryption algorithm.

Step 11). The session initiating party A sends a message ($z_j$, $E_{Kc}(ID_1)$) to parties who have sent a message satisfying Equation (12).

Step 12). The party j calculates an inverse element $v_j^{-1}$ of the integer $v_j$ in modulo p−1 and the shared key $K_C$ using the inverse element $v_j^{-1}$, as represented by the following Equation (15).

$$K_c = (z_j)^{v_j^{-1}} (\bmod p) \qquad (15)$$

$E_{Kc}(ID_1)$ is decrypted with the shared key $K_C$ obtained from Equation (15). If $ID_1$ is valid, the encryption protocol using the shared key $K_C$ proceeds. If not, the protocol is terminated.

Unfortunately, Xu and Tilborg's multi-party key sharing protocol performed through the aforementioned steps cannot prevent a disguised attack or ensure forward secrecy. Both of these features are important in a multi-party key sharing protocol.

A disguised attack is made by an attacker who utilizes ID information of a party participating the session to intervene in the protocol. In this case, it is necessary to detect and prevent the disguised attack. However, Xu and Tilborg's protocol cannot detect the disguised attack. This is because the following Equation (16) is satisfied using the parameters $w_j$ and $n_j$ with the same variable $v_j$, as represented by Equations (9) and (10).

$$n_j = w_j^{v_j t} \qquad (16)$$

The attacker generates a shared key $K_C'$ and a variable $z_j'$ represented by the following Equations (17) and (18), respectively, in Step 9), encrypts ID information $ID_1$ using the shared key $K_C'$ and variable $z_j'$, and sends a message ($z_j'$, $E_{Kc'}(ID_1)$) to the session participating parties.

$$K_C' = y^r (\bmod p) \qquad (17)$$

$$z_j' = w_j^r (\bmod p) \qquad (18)$$

The session participating parties perform the protocol, mistaking the message for a valid message. This is because the shared key $K_C'$ is calculated using the following Equation (19), and the ID information $ID_1$ is obtained by decrypting $E_{Kc'}(ID_1)$ using the shared key $K_C'$.

$$K_C' = (z_j')^{v_j^{-1}} (\bmod p) \qquad (19)$$

In addition, the attacker calculates the shared key $K_C'$ and the variable $z_j'$ represented by the following Equations (20) and (21), respectively, in Step 9), encrypts ID information $ID_1$ using the shared key $K_C'$ and variable $z_j'$, and sends a message ($z_j'$, $E_{Kc'}(ID_1)$) to the session participating parties.

$$K_C' = w_1^r (\bmod p) \qquad (20)$$

$$z_j' = n_j^r (\bmod p) \qquad (21)$$

The session participating parties perform the protocol, mistaking the message for a valid message. This is because the shared key $K_C'$ is calculated using the following Equation (22), and the ID information $ID_1$ is obtained by decrypting $E_{Kc'}(ID_1)$ using the shared key $K_C'$ $$K_C' = (z_j')^{v_j^{-1}} (\bmod p) \qquad (22)$$

The reason that the session participating parties cannot detect the attacker's disguised attack is that each party receiving the variables $z_j$ generates the session shared keys using only its own selected integer $v_j$, irrespective of the session initiating party's selected integer $v_1$. Accordingly, there is a need to improve the method of generating the variables $z_j$.

Forward secrecy is secrecy that, when permanent secret keys (long term keys) $s_i$(i=A, B, C) for more than one party participating the protocol are revealed, the attacker cannot determine information regarding keys of past sessions using the revealed long term keys. If a permanent secret key is revealed in a cryptographic system in which forward secrecy is not ensured, all data in past encryption sessions may be revealed, even if a new secret key is generated.

In Xu and Tilborg's protocol, the secret value $v_j$ used to obtain the shared key in Equation (15) is used in Equation (11) as it is. If a secret key $s_j$ of a session participating party j is revealed, and if the attacker obtains messages sent at a past session, he can calculate the secret value $v_j$ using Equation (11) using the known values of the parameters $w_j$, $n_j$, and $\eta_j$, and the past shared key using Equation (15). As a result, the secrecy for the data encrypted in the past session cannot be ensured.

In addition, there is a potentially weak point in Xu and Tilborg's protocol in which the signature for authentication may be forged. Comparing Equations (9) and (11) with Schnorr's signature generation method, the parameter $n_j$ corresponds to a message and the parameters $w_j$ and $\eta_j$ correspond to signature values, respectively. In general, the signature value generation performed by applying a hash function to the message at the time of writing the signature is considered an indispensable procedure in order to prevent signature forgeries.

On the other hand, when the attacker knows the values of the parameters $w_j$, $n_j$, and $\eta_j$, the parameters $w_j'$, $n_j'$, and $\eta_j'$ satisfying Equation (12) can be generated, as represented by Equations (23) through (25).

$$w_j' = (w_j)^t (\bmod p-1) \qquad (23)$$

$$n_j' = n_j t w_j \qquad (24)$$

$$\eta_j' = \eta_j t w_j \qquad (25)$$

In this case, there is a potentially weak point in that an attacker can be disguised, although he cannot share the key.

Figure 2:
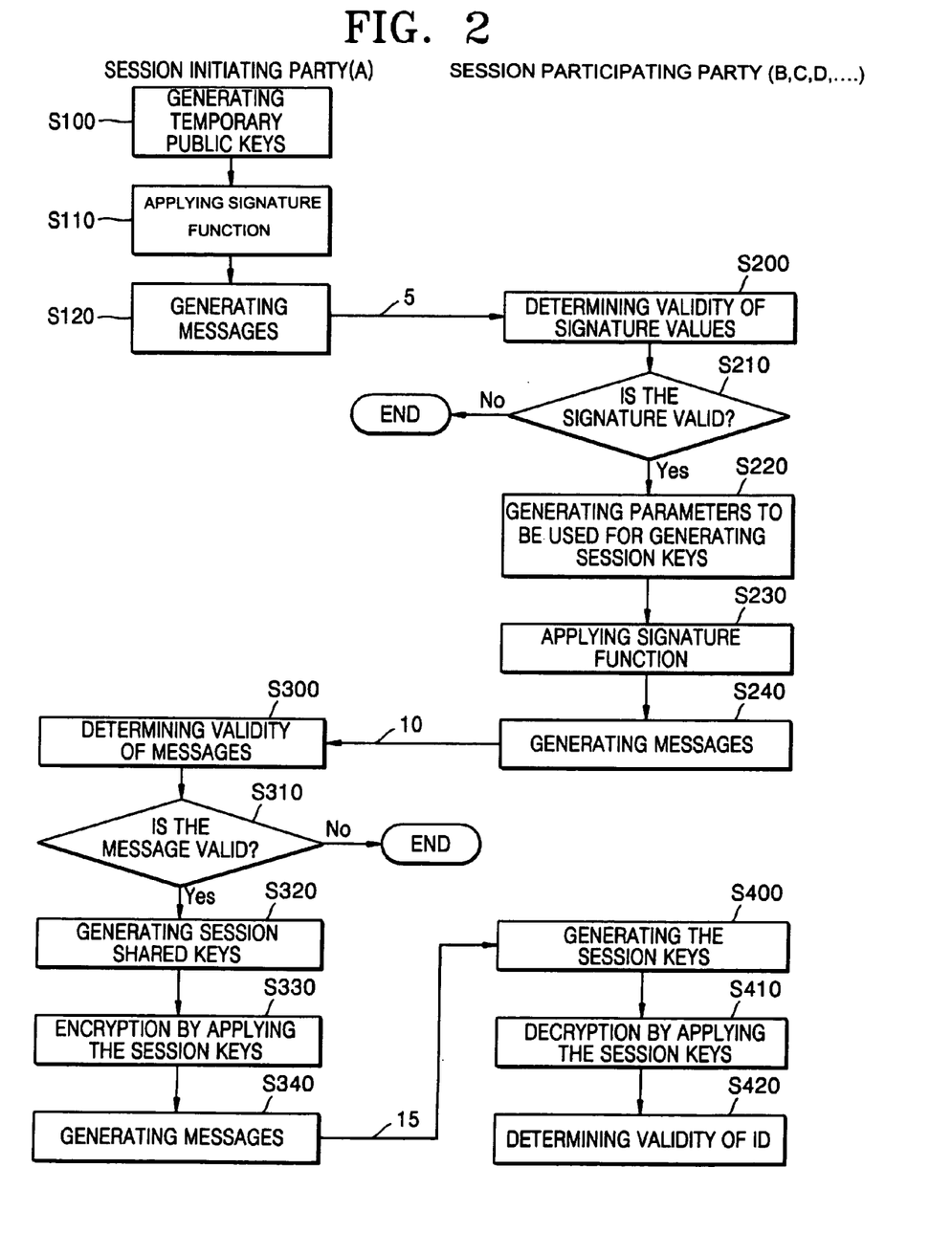
FIG. 2 is a flowchart illustrating steps of a conference session key distribution method according to the present invention.

FIG. 2 is a flowchart illustrating steps of a conference session key distribution method according to the present invention. The parties involved in the key distribution method are classified into a session initiating party A and session participating parties B, C, D, . . . . In the protocol, the session initiating party is sometimes called a chairperson, because the session initiating party seems to preside over a meeting.

In the ID-based cryptographic system, a conference session key distribution protocol includes an ID-based cryptographic system implementation step and a key sharing protocol step. The ID-based cryptographic system is constructed with a signature providing system. In the system, if a public key can be derived from personal ID information or is previously provided, the public key may not be sent. On the other hand, if the public key information is needed, e.g., when a signature is to be authenticated, the public key is sent.

Now, exemplary embodiments of the key sharing protocol used in the ID-based cryptographic system proposed by Harn and Yang will be described.

All the parties participating the session know public key parameters G, p, q, $\alpha$, y and f. The parameter G, which is a partial group of a group GF(P)*, is a finite group having the sufficiently large prime number p as an order. The parameter q is a sufficiently large prime number, and the associated integer q−1 has p as its factor. In this embodiment, an operation with respect to the group G is a multiplication. The group G has the parameter $\alpha$ as its generation source. The parameter y is a public key of KAC. The parameter f is a hash function. Each party i (i=A, B, C, . . . ) has a secret key $s_i$ and a public key $r_i$ provided by KAC.

In Harn and Yang's cryptographic system, the ID information, the public key and the secret key satisfy the following Equation (26).

$$y^{s_i} = \alpha^{f(ID_i)} (r_i^{r_i})^{-1} \bmod q \qquad (26)$$

The steps of the shared key distribution method according to an embodiment of the present invention are as follows.

The party A randomly selects two numbers $u_1$ and $v_1$ between integers 1 and p−1. The two numbers $u_1$ and $v_1$ become temporary secret keys for the session. If an operational time interval of the random function is longer than that of the hash function, a value obtained by hashing the temporary secret key $u_1$ may be used as the temporary secret key $v_1$ in order to reduce the operational time interval.

The temporary public keys $w_1$ and $n_1$, represented by the following Equations (27) and (28), respectively, are generated using the temporary secret keys $u_1$ and $v_1$ in step S100.

$$w_1 = y^{v_1} (\bmod q) \qquad (27)$$

$$n_1 = w_1^{u_1} (\bmod q) \qquad (28)$$

These are the temporary public keys in the session.

The signature value $\eta_1$, represented by the following Equation (29), is generated using the temporary secret keys $u_1$, $v_1$, the temporary public keys $w_1$, $n_1$, a permanent secret key $s_1$, the ID information $ID_1$ of the party A, and time information time in step S110. The function of Equation (29) is referred to as a signature function.

$$\eta_1 = (f(n_1, ID_1, time) - v_1 w_1) s_1^{-1} (\bmod p) \qquad (29)$$

The party A generates a message ($ID_1$, $r_1$, $w_1$, $n_1$, $\eta_1$, time) 5 and sends the message 5 to the session participating parties in step S120.

The session participating parties receive the message ($ID_1$, $r_1$, $w_1$, $n_1$, $\eta_1$, time) 5 and determine whether the message 5 satisfies the following Equation (30) in step S200.

$$y^{f(n_1, ID_1, time)} = w_1^{w_1} (\alpha^{EID_1} r_1^{-r_1})^{n_1} (\bmod q) \qquad (30)$$

where $EID_1 = f(ID_1)$.

Step 210 determines whether the signature is valid. If the message is sent by a valid session initiating party, it satisfies Equation (30). If the message 5 is sent by an invalid session initiating party, it does not satisfy Equation (30). Therefore, the validity of the message sent by the party A can be completely determined using Equation (30). If Equation (30) is satisfied, the protocol proceeds to the next step. Otherwise, the protocol is terminated.

Each session participating party randomly selects two integers $u_j$ and $v_j$ (j=B, C, D, . . . ) between integers 1 and p−1.

The two integers become temporary secret keys of the corresponding session participating party. If an operational time interval of the random function is longer than that of the hash function, a value obtained by hashing the temporary secret key $u_j$ may be used as the temporary secret key $v_j$, in order to reduce the operational time interval.

The temporary public keys $w_j$ and $n_j$, represented by the following Equations (31) and (32), respectively, are generated using the temporary secret keys $u_j$ and $v_j$ of each session participating party in step S220.

$$w_j = y^{v_j} (\bmod q) \qquad (31)$$

$$n_j = w_1^{u_j} (\bmod q) \qquad (32)$$

These temporary public keys become parameters for generating session keys.

The signature value $\eta_j$, given by the following Equation (33), is generated by applying $u_j$, $v_j$, the temporary public keys $w_j$, $n_j$, a permanent secret key $s_j$, and the ID information $ID_j$ of the party j (=B, C, D, . . . ) to the signature function in step S230.

$$\eta_j = (f(n_j) - v_j w_j) s_j^{-1} (\bmod p) \qquad (33)$$

Each session participating party generates its own message ($ID_j$, $r_j$, $w_j$, $n_j$, $\eta_j$) 10, and sends the message 10 to the session initiating party A in step S240.

The session initiating party A receives the message 10 from each session participating party, and determines whether the message 10 satisfies the following Equation (34) using the received variables in step S300.

$$y^{f(n_j)} = w_j^{w_j} (\alpha^{EID_j} r_j^{-r_j})^{n_j} (\bmod q) \qquad (34)$$

where $EID_j = f(ID_j)$.

If the message 10 is sent by a valid session participating party, it satisfies Equation (34). If the message 10 is sent by an invalid session participating party, it does not satisfy Equation (34). Therefore, the validity of the message sent by each session participating party can be completely determined using Equation (34). In step S310, if Equation (34) is satisfied, the protocol proceeds to the next step. Otherwise, the protocol is terminated.

The session initiating party A generates a shared key $K_C$ and a variable $z_j$, which is used for generating the shared keys in the session participating parties, represented by the following Equations (35) and (36), respectively in step S320.

$$K_C = n_1^{u_1} (\bmod q) \qquad (35)$$

$$z_j = (n_1 \cdot n_j)^{u_1} (\bmod q) \qquad (36)$$

The session initiating party A generates $E_{Kc}(ID_1)$ by encrypting its own ID information $ID_1$ with the shared key $K_C$ in step S330. Here, E is an encryption algorithm.

In step 340, the session initiating party A sends the message ($z_j$, $E_{Kc}(ID_1)$) 15 to the session participating parties which have sent messages determined to be valid in step S310.

In step S400, the session participating parties receiving the message 15 calculate shared keys $K_C$ in accordance with the following Equation (37).

$$K_C = z_j \cdot (n_1^{u_j})^{-1} (\bmod q) \qquad (37)$$

The ID information is obtained by decrypting $E_{Kc}(ID_1)$ with the shared key $K_C$ obtained from Equation (37) in step S410. In step S420, it is determined whether $ID_1$ is identical to the ID information $ID_1$ received in the message 15. If the ID information of the session initiating party A is identical, the encryption protocol using the shared key $K_C$ proceeds. If not, the protocol is terminated.

Now, exemplary embodiments of the key sharing protocol according to the present invention used in the ID-based cryptographic system using a Weil Pairing function defined in an elliptic curve encryption group will be described.

All the parties participating the session know public key parameters G, p, q, $\alpha$, y, e, $f_1$, $f_2$, and $f_3$. The parameter G is a finite group having a sufficiently large prime number p as an order. The group G has the parameter $\alpha$ as its generation source. The parameter y is a public key of KAC. The parameter e is a Weil Pairing function defined in an elliptic curve. The parameters $f_1$ and $f_2$ are hash functions defined in the integer field. The parameter $f_3$ is a hash function defined in the group G. In this embodiment, an operation with respect to the group G is an addition. The expression [x]y is a value of x-times addition on the element y of the group G.

Each party i (i=A, B, C, . . . ) has a secret key $s_i$ and a public key $r_i$ provided by KAC. The public key $r_i$ is a value derived from the ID information $ID_i$ of each party i. The secret key $s_i$ is calculated using the following Equation (38).

$$s_i = [s] \cdot r_i \qquad (38)$$

The value s in Equation (38) is known to only the KAC and satisfies the following Equation (39).

$$y = [s]\alpha \qquad (39)$$

Steps of the shared key distribution method according to an embodiment of the present invention are as follows.

The party A randomly selects two numbers $u_1$ and $v_1$ between 1 and p−1. The two numbers $u_1$ and $v_1$ become temporary secret keys for the session. In a case where an operational time interval of the random function is longer than that of the hash function, a value obtained by hashing the temporary secret key $u_1$ may be used as the temporary secret key $v_1$ in order to reduce the operational time interval.

The temporary public keys $w_1$ and $n_1$ represented by the following Equations (40) and (41), respectively, are generated using the temporary secret keys $u_1$ and $v_1$ in step S100.

$$w_1 = [v_1]\alpha \qquad (40)$$

$$n_1 = [u_1]w_1 \qquad (41)$$

The signature value $\eta_1$, determined by the following Equation (42), is generated using the temporary secret keys $u_1$, $v_1$, the temporary public keys $w_1$, $n_1$, a permanent secret key $s_1$, the ID information $ID_1$ of the party A, and time information time in step S110.

$$\eta_1 = [v_1^{-1}]([f_2(f_3(n_1),ID_1,\text{time})]\alpha + [f_3(w_1)]s_1) \qquad (42)$$

The party A generates a message ($ID_1$, $w_1$, $n_1$, $\eta_1$, time) 5 and sends the message 5 to the session participating parties in step S120.

The session participating parties receive the message ($ID_1$, $w_1$, $n_1$, $\eta_1$, time) 5 and determine whether the message 5 satisfies the following Equation (43) in step S200.

$$e(w_1,\eta_1) = e(\alpha,[f_2(f_3(n_1),ID_1,\text{time})]\alpha) \cdot e(y,[f_3(w_1)]r_1) \qquad (43)$$

If the message 5 is sent by a valid session initiating party, it satisfies Equation (43). If the message 5 is sent by an invalid session initiating party, it does not satisfy Equation (43). Therefore, the validity of the message sent by the party A can be completely determined using Equation (43). If Equation (43) is satisfied, the protocol proceeds to the next step. Otherwise, the protocol is terminated in step S210.

Each session participating party randomly selects two integers $u_j$ and $v_j$ (j=B, C, D, . . . ) between 1 and p−1 as its temporary secret keys, and generates its temporary public keys $w_j$ and $n_j$ represented by the following Equations (44) and (45), respectively, in step S220. The temporary public keys become parameters used for generating the session key. If an operational time interval of the random function is longer than that of the hash function, a value obtained by hashing the temporary secret key $u_j$ may be used as the temporary secret key $v_j$ in order to reduce the operational time interval.

$$w_j = [v_j]\alpha \qquad (44)$$

$$n_j = [u_j]w_1 \qquad (45)$$

The signature value $\eta_j$ represented by the following Equation (46) is generated by applying the temporary secret keys, the temporary public keys, a permanent secret key, and the ID information $ID_j$ of the party j (j=B, C, D, . . . ) to the signature function in step S230).

$$\eta_j = [v_j^{-1}]([f_3(n_j)]\alpha + [f_3(w_j)]s_j) \qquad (46)$$

Each session participating party generates its own message ($ID_j$, $w_j$, $n_j$, $\eta_j$) 10 and sends the message 10 to the session initiating party A in step S240.

The session initiating party A receives the message 10 from each session participating, and determines that the message satisfies the following Equation (47) using the received variables in step S300.

$$e(w_j,\eta_j) = e(\alpha,[f_3(n_j)]\alpha) \cdot e(y,[f_3(w_j)]r_j) \qquad (47)$$

If the message 10 is sent by a valid session participating party, it satisfies Equation (47). If the message 10 is sent by an invalid session participating party, it does not satisfy Equation (47). Therefore, the validity of the message sent by each session participating party can be completely determined using Equation (47). In step S310, if Equation (47) is satisfied, the protocol proceeds to the next step. Otherwise, the protocol is terminated.

In step 320, the session initiating party A generates a shared key $K_C$ and a variable $z_j$, which is used for generating the shared keys in the session participating parties, represented by the following Equations (48) and (49), respectively.

$$K_C = [u_1]n_1 \qquad (48)$$

$$z_j = [u_1](n_1 + n_j) \qquad (49)$$

In step S330, the session initiating party A generates $E_{K_C}(ID_1)$ by encrypting its own ID information $ID_1$ with the shared key $K_C$. Here, the symbol E is an encryption algorithm.

In step S340, the session initiating party A sends the message ($z_j$, $E_{K_C}(ID_1)$) 15 to the session participating parties which have sent messages determined to be valid in step S310.

In step S400, the session participating parties receiving the message 15 calculate shared keys $K_C$ represented by the following Equation (50).

$$K_C = z_j - [u_j]n_1 \qquad (50)$$

The ID information is obtained by decrypting $E_{K_C}(ID_1)$ with the shared key $K_C$ obtained from Equation (50) in step S410. In step S420, it is determined whether $ID_1$ is identical to the ID information $ID_1$ received in the message 5. If the ID information of the session initiating party A is identical, the encryption protocol using the shared key $K_C$ proceeds. If not, the protocol is terminated.

According to the exemplary embodiments of the shared key distribution method of the present invention, it is possible to prevent the disguised attack by generating two different temporary secret keys in Steps S100 and S220 in order for the attacker not to know the values of the two temporary secret keys, and using the temporary secret keys of the session initiating party at the time of generating the session key generation variables $Z_j$. In addition, it is possible to ensure the forward secrecy by preventing the attacker from calculating the past session shared keys even in a case where the attacker may know the permanent secret keys of the parties participating the session. Further, it is possible to prevent the attacker from being disguised without sharing keys by solving the potentially weak point in Xu and Tilborg's protocol. Since there is no increase in calculation amount, the protocol of the present invention is more effective than the conventional protocol.

According to the shared key distribution method of the present invention, it is possible to provide an effective ID-based cryptographic system capable of preventing a disguised attack and ensuring a forward secrecy by selecting two different temporary secret keys, generating a message and generating session key generation variables using temporary secret keys of a session initiating party.

The present invention can be implemented with codes recorded on a computer-readable storage medium. As used herein, "computer" includes all apparatuses having data processing functions. The computer-readable storage media includes all kinds of recording apparatuses which can be read by computers. Examples of computer-readable apparatuses include ROMs, RAMs, CD-ROMs, magnetic tapes, floppy disks, and optical data storage devices.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of operating an ID-based cryptographic system via a computer, the ID-based cryptographic system including a session initiating party and a plurality of session participating parties, by distributing a session shared key for encryption from the session initiating party to the plurality of session participating parties in a single conference session via the computer, the method comprising:
   (a) generating two temporary secret keys for the session initiating party, two temporary public keys for the session initiating party, and a signature value obtained by applying a predetermined signature function to the two temporary public keys for the session initiating party;
   (b) sending a message, including ID information of the session initiating party, the two temporary public keys for the session initiating party, and the signature value, to each session participating party;
   (c) receiving messages, including two temporary public keys for each session participating party, from each session participating party, and determining validity of the messages;
   (d) generating shared key generation variables for each session participating party that has sent a valid message;
   (e) generating the session shared key and encrypting the ID information of the session initiating party using the session shared key; and
   (f) sending a message including the shared key generation variables and the encrypted ID information to each session participating party that has sent a valid message.

2. The method of operating the ID-based cryptographic system as claimed in claim 1,
   wherein the ID-based cryptographic system is a system satisfying an equation $y^{s_i} = \alpha^{f(ID_i)} (r_i^{r_i})^{-1} \mod q$ on a finite group G having an order p, that is, a partial group of $GF(q)^*$, wherein q is a sufficiently large prime number and the associated integer q−1 has p as its factor, and wherein parameters y, $\alpha$, f, $r_i$, $s_i$, and $ID_i$ are a public key of a key authentication center, a generation source of the finite group G, a hash function, a public key for a party i, a secret key for the party i, and ID information, respectively, and
   wherein step (a) comprises:
   (a1) randomly selecting temporary secret keys $u_1$ and $v_1$ between 1 and p−1;
   (a2) generating temporary public keys $w_1 = y^{v_1} \pmod{q}$ and $n_1 = w_1^{u_1} \pmod{q}$; and
   (a3) generating the signature value $\eta_1 = (f(n_1, ID_1, \text{time}) - v_1 w_1) s_1^{-1} \pmod{p}$, wherein parameters $ID_1$ and time are ID information of the session initiating party and time information.

3. The method of operating a then ID-based cryptographic system as claimed in claim 2, wherein step (a1) comprises:
   (a11) randomly selecting the first temporary secret key $u_1$ between 1 and p−1; and
   (a12) generating the second temporary secret key $v_1$ by applying the hash function to the first temporary secret key $u_1$.

4. The method of operating the ID-based cryptographic system as claimed in claim 2, wherein step (c) comprises:
   (c1) receiving messages ($ID_j$, $r_j$, $w_j$, $n_j$, $\eta_j$) from each session participating party, wherein parameters $ID_j$, $r_j$, $w_j$, $n_j$, and $\eta_j$ are ID information of each party j, a permanent public key of each party j, temporary public keys generated by each party j, and a signature value generated by each party j; and
   (c2) determining whether a message received from each party j satisfy an equation $y^{f(n_j)} = w_j^{w_j} (\alpha^{EID_j} r_j^{-r_j})^{\eta_j} \pmod{q}$, wherein $EID_j = f(ID_j)$.

5. The method of operating the ID-based cryptographic system as claimed in claim 4, wherein step (d) includes generating the public key generation variable $z_j = (n_1 \cdot n_j)^{u_1} \pmod{q}$ for each session participating party having sent a message which satisfies the equation in step (c2).

6. The method of operating the ID-based cryptographic system as claimed in claim 4, wherein step (e) comprises:
   (e1) generating the session shared key $K_C = n_1^{u_1} \pmod{q}$; and
   (e2) encrypting the ID information of the session initiating party using the session shared key to generate $E_{K_C}(ID_1)$, where E is an encryption algorithm.

7. The method of operating the ID-based cryptographic system as claimed in claim 1,
   wherein the ID-based cryptographic system is a system using a Weil Pairing operation in a finite elliptic curve encryption group G having a sufficiently large prime number p as an order,
   wherein step (a) comprises:
   (a1) randomly selecting temporary secret keys $u_1$ and $v_1$ between 1 and p−1;
   (a2) generating temporary public keys $w_1 = [v_1]\alpha$ and $n_1 = [u_1]w_1$, wherein the parameter $\alpha$ is a generation source of the finite elliptic curve encryption group G; and
   (a3) generating the signature value $\eta_1 = [v_1^{-1}]([f_2(f_3(n_1), ID_1, \text{time})]\alpha[f_3(w_1)]s_1)$, where $f_2$, $f_3$, $ID_1$, time, and $s_1$ are a hash function defined in an integer domain, a hash function defined in the finite elliptic curve encryption group G, ID information of the session initiating party, time information, and a permanent secret key of the session initiating party, respectively.

8. The method of operating the ID-based cryptographic system as claimed in claim 7, wherein step (a1) comprises:
- (a11) randomly selecting the first temporary secret key $u_1$ between 1 and p−1; and
- (a12) generating the second temporary secret key $v_1$ by applying the hash function to the first temporary secret key $u_1$.

9. The method of operating the ID-based cryptographic system as claimed in claim 7, wherein step (c) comprises:
- (c1) receiving messages $(ID_j, w_j, n_j, \eta_j)$ from each session participating party, wherein parameters $ID_j, w_j, n_j$, and $\eta_j$ are ID information of each party j, temporary public keys generated by each party j, and a signature value generated by each party j, respectively; and
- (c2) determining whether a message received from each party j satisfies an equation, $e(w_j, \eta_j) = e(\alpha, [f_3(n_j)]\alpha) \cdot e(y, [f_3(w_j)]r_j)$ where e, y, and $r_j$ are a Weil Pairing function defined on an elliptic curve, a public key of a key authentication center, and a permanent public key of each session participating party j, respectively.

10. The method of operating the ID-based cryptographic system as claimed in claim 9, wherein step (d) includes generating the public key generation variable $z_j = [u_1](n_1 + n_j)$ for the session participating parties having sent a message that satisfies the equation in step (c2).

11. The method of operating the ID-based cryptographic system as claimed in claim 9, wherein step (e) comprises:
- (e1) generating the session shared key $K_C = [u_1]n_1$; and
- (e2) encrypting the ID information of the session initiating party using the session shared key to generate $E_{Kc}(ID_1)$, wherein E is an encryption algorithm.

12. A method of operating an ID-based cryptographic system via a computer, the ID-based cryptographic system including a session initiating party and a plurality of session participating parties, by distributing a session shared key for encryption from the session initiating party to the plurality of session participating parties in a single conference session via the computer, the method comprising:
- (a) receiving a message, including ID information, a temporary public key, and a predetermined signature value of the session initiating party, from each session participating party, and determining validity of the message;
- (b) generating two temporary secret keys for each session participating party, two temporary public keys for each session participating party, and a signature value obtained by applying a predetermined signature function to the two temporary public keys for each session participating party;
- (c) sending a message, including the temporary public keys for each session participating party and the signature value, to the session initiating party;
- (d) receiving a message, including a shared key generation variable and encrypted ID information of the session initiating party, from the session initiating party;
- (e) generating the session shared key using the shared key generation variable and the temporary secret keys for each session participating party; and
- (f) decrypting the encrypted ID information of the session initiating party using the session shared key, and determining whether the session shared key is valid.

13. The method of operating the ID-based cryptographic system as claimed in claim 12,
wherein the ID-based cryptographic system is a system satisfying an equation $y^{s_i} = \alpha^{f(ID_i)}(r_i^{r_i})^{-1}$ mod q on a finite group G having an order p, that is, a partial group of $GF(q)^*$, wherein q is a sufficiently large prime number and the associated integer q−1 has p as its factor, and wherein parameters y, $\alpha$, f, $r_i$, $s_i$, and $ID_i$ are a public key of a key authentication center, a generation source of the finite group G, a hash function, a public key for a party i, a secret key for the party i, and ID for the party i, respectively,
wherein step (b) comprises:
- (b1) randomly selecting temporary secret keys $u_j$ and $v_j$ between 1 and p−1;
- (b2) generating temporary public keys $w_1 = y^{v_1}$ (mod q) and $n_1 = w_1^{u_1}$ (mod q); and
- (b3) generating the signature value $\eta_1 = (f(n_1, ID_1, time) - v_1 w_1)s_1^{-1}$ (mod p).

14. The method of operating the ID-based cryptographic system as claimed in 13, wherein step (b1) comprises:
- (b11) randomly selecting the first temporary secret key $u_j$ between 1 and p−1; and
- (b12) generating the second temporary secret key $v_j$ by applying the hash function to the first temporary secret key $u_j$.

15. The method of operating the ID-based cryptographic system as claimed in 13, wherein step (a) comprises:
- (a1) receiving a message $(ID_1, r_1, w_1, n_1, \eta_1, time)$ from the session initiating party, wherein parameters $ID_1, r_1, w_1, n_1, \eta_1$, and time are ID information of the session initiating party, a permanent public key of the session initiating party, temporary public keys generated by the session initiating party, a signature value generated by the session initiating party, and time information; and
- (a2) determining whether the message satisfies an equation $y^{f(n_1, ID_1, time)} = w_1^{w_1} (\alpha^{EID_1} r_1^{-r_1})^{\eta_1}$ (mod q), where $EID_1 = f(ID_1)$.

16. The method of operating the ID-based cryptographic system as claimed in claim 15, wherein step (e) includes generating the session shared key $K_C = z_j \cdot (n_1^{u_j})^{-1}$ (mod q), where $z_j$ is the shared key generation variable received from the session initiating party.

17. The method of operating the ID-based cryptographic system as claimed in claim 12,
wherein the ID-based cryptographic system is a system using a Weil Pairing operation in a finite elliptic curve encryption group G having a sufficiently large prime number p as an order, and
wherein step (b) comprises:
- (b1) randomly selecting temporary secret keys $u_j$ and $v_j$ between 1 and p−1;
- (b2) generating temporary public keys $w_j = [v_j]\alpha$ and $n_j = [u_j]w_1$, wherein the parameters $\alpha$ is a generation source of the finite elliptic curve encryption group G; and
- (b3) generating the signature value $\eta_j = [v_j^{-1}]([f_3(n_j)]\alpha + [f_3(w_j)]s_j)$, wherein $f_3$ and $s_j$ are a hash function defined in the finite elliptic curve encryption group G and a permanent secret key of the party j, respectively.

18. The method of operating the ID-based cryptographic system as claimed in claim 17, wherein step (b1) comprises:
- (b11) randomly selecting the first temporary secret key $u_j$ between 1 and p−1; and
- (b12) generating the second temporary secret key $v_j$ by applying the hash function to the first temporary secret key $u_j$.

19. The method of operating the ID-based cryptographic system as claimed in claim 17, wherein step (a) comprises:
- (a1) receiving a message $(ID_1, w_1, n_1, \eta_1, time)$ from the session initiating party, wherein parameters $ID_1, w_1, n_1, \eta_1$ and time are ID information of the session initiating party, temporary public keys generated by the session initiating party, a signature value generated by the session initiating party, and time information; and (a2) determining whether the message satisfies an equation $e(w_1, \eta_1)=e(\alpha,[f_2(f_3(n_1), ID_1, time)]\alpha \cdot e(y,[f_3(w_1)]r_1)$, wherein e, $f_2$, $f_3$, y, and $r_1$ are a Weil Pairing function defined on an elliptic curve, a hash function defined in an integer domain, a hash function defined in the finite elliptic curve encryption group G, a public key of a key authentication center, and a permanent public key of the session initiating party, respectively.

20. The method of operating the ID-based cryptographic system as claimed in claim 19, wherein step (e) includes generating the session shared key $K_C=z_j-[u_j]n_1$, where $z_j$ is the shared key generation variable received from the session initiating party.

21. The method of operating the ID-based cryptographic system as claimed in claim 12, wherein step (f) comprises:

(f1) decrypting the encrypted ID information of the session initiating party received from the session participating party using the session shared key; and (f2) determining whether the decrypted ID information of the session initiating party is identical to the ID information of the session initiating party received in step (a).

22. A computer-readable storage medium on which a program is recorded, wherein the program is executed in a computer, the program comprising:

(a) generating two temporary secret keys for the session initiating party, two temporary public keys for the session initiating party, and a signature value obtained by applying a predetermined signature function to the two temporary public keys for the session initiating party;

(b) sending a message, including ID information of the session initiating party, the temporary public keys for the session initiating party, and the signature value, to each session participating party;

(c) receiving a message, including the temporary public keys for each session participating party, from each session participating party, and determining validity of the messages;

(d) generating shared key generation variables for each session participating party that has sent a valid message;

(e) generating a session shared key and encrypting the ID information of the session initiating party using the session shared key; and (f) sending a message, including the shared key generation variables and the encrypted ID information, to each session participating party that has have sent a valid message.

23. A computer-readable storage medium on which a program is recorded, wherein the program is executed in a computer, the program comprising:

(a) receiving a message, including ID information, a temporary public key, and a predetermined signature value of the session initiating party, from each session participating party, and determining validity of the message;

(b) generating two temporary secret keys for each session participating party, two temporary public keys for each session participating party, and a signature value obtained by applying a predetermined signature function to the two temporary public keys for each session participating party;

(c) sending a message, including the temporary public keys for each session participating party and the signature value, to the session initiating party;

(d) receiving a message, including a shared key generation variable and encrypted ID information of the session initiating party, from the session initiating party;

(e) generating a session shared key using the shared key generation variable and the temporary secret keys for each session participating party; and (f) decrypting the encrypted ID information of the session initiating party using the session shared key, and determining whether the session shared key is valid.

\* \* \* \* \*